UNITED STATES PATENT OFFICE.

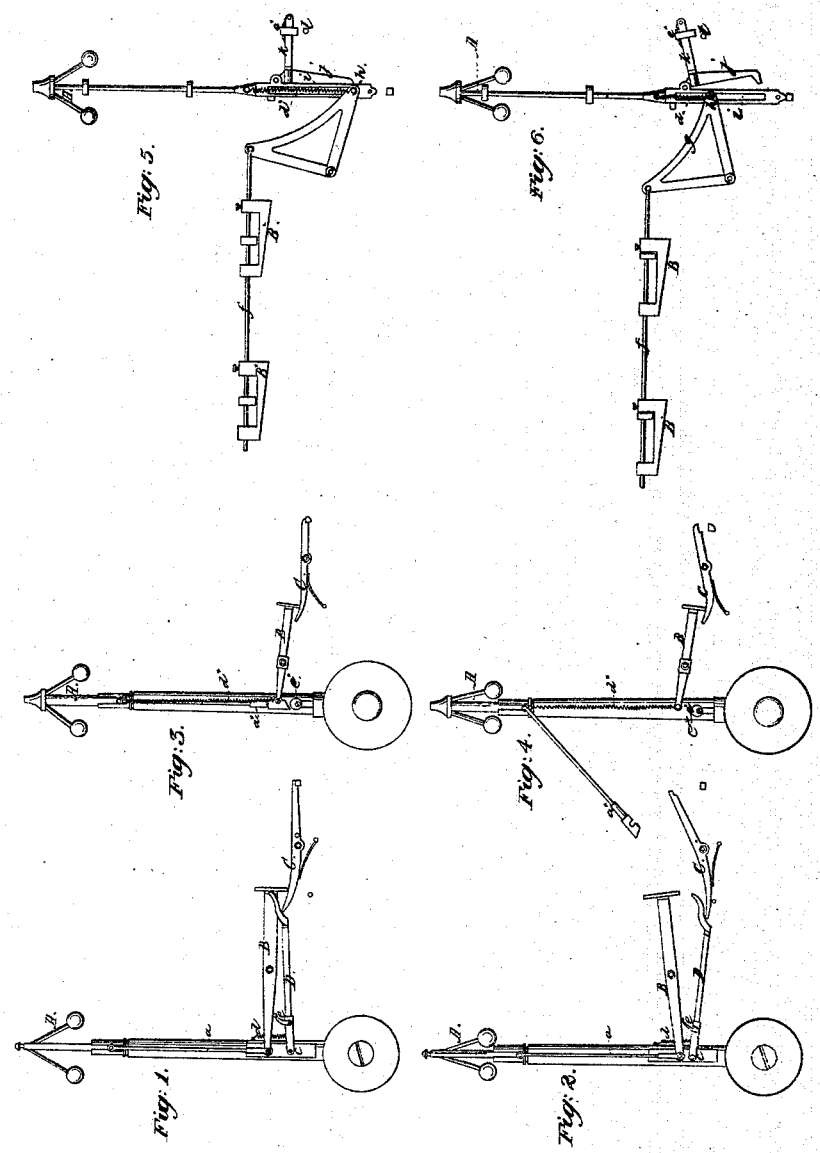

JOHN JACKMAN, JR., OF NEWBURYPORT, MASSACHUSETTS, ASSIGNOR TO THE AMERICAN AUTOMATIC STOP MOTION COMPANY, OF SAME PLACE.

IMPROVEMENT IN AUTOMATIC STOP-MOTIONS FOR STEAM-ENGINES.

Specification forming part of Letters Patent No. 47,357, dated April 18, 1865.

DIVISION A.

*To all whom it may concern:*

Be it known that I, JOHN JACKMAN, Jr., of Newburyport, in the county of Essex and State of Massachusetts, have invented a new and Improved Stop-Motion for Steam-Engines, &c.; and I do hereby declare that the following is a full, clear, and exact description thereof, which will enable those skilled in the art to make and use the same, reference being had to the accompanying drawings, forming part of this specification, in which—

Figure 1 represents a side elevation of this invention, showing its application to a Corliss cut-off when in running order. Fig. 2 is a similar view of the same when the governor-balls have dropped and the engine is stopped. Fig. 3 is a similar view to Fig. 1 of a modification of this invention. Fig 4 is an elevation of the same when the engine stops. Fig. 5 is an elevation of this invention as applied to a double valve, showing the parts in running position. Fig. 6 is a similar view of the same when the engine stops.

Similar letters of reference indicate corresponding parts.

This invention consists in combining the trip-lever of a Corliss engine or an equivalent part of any other engine with the governor and with a button and spring in such a manner that when the engine is running at its regular speed and the governor-balls assume their normal or mean position the trip-lever acts on the shoes or catches and the position and throw of the cut-off valve or valves is regulated by this governor; but if the balls drop down from any cause while the engine is in motion the combined action of the button and spring on the trip-lever, or any other equivalent or intermediate parts, trips off the shoes or catches or equivalent parts of the cut-off or valve and the supply of steam is shut off. The spindle or rod of the governor A connects with the trip-lever B by means of a rod, *a*. If the balls are in their normal position, which they assume when the engine runs at its regular speed, the trip-lever touches the shoes or catches C and raises their inner ends slightly but not far enough to trip them off, and by their action the cut-off valve is opened more or less at every stroke of the piston. If the speed of the engine increases and the balls fly out beyond their normal position, the trip-lever depresses the inner ends of the shoes and their points are tripped off or brought in such a position that they do not open the cut-off valve until the engine reassumes its regular speed; but if from any cause—for instance if the belt of the governor breaks—the balls drop down while the engine is running, the trip-lever is raised to the position shown in Fig. 2, and unless some provision is made to trip off the shoes the engine takes full steam and begins to race. To avoid this trouble and to stop the engine automatically before any injury can occur is the object of my invention, and the various ways in which this purpose can be effected are shown in the drawings.

In Figs. 1 and 2 the rod *a*, connecting the governor spindle or rod with the trip-lever, is hinged at both ends and not made to disengage at either end. A forked lever, D, is connected to the governor stand, under the trip-lever, by means of a fulcrum pin or pivot, *c*, and a spring, *d*, is applied to it in such a manner that its forked loose end is raised above the inner ends of the shoes and does not interfere with their action. Said forked lever is provided with a button, *e*, which, when the engine is running at its regular speed, is turned up as shown in the drawings, and the spring *d* keeps the point of the button in contact with the lower edge of the trip-lever. If the balls drop down from any cause, the inner end of the trip-lever is depressed to a position shown in Fig. 2, and by its action on the button *e* the forked lever is depressed against the action of the spring *d* and the shoes are tripped off. The same purpose is effected by the combined action of the spring *d\** and button *e\**, in Figs. 3 and 4. In this case the rod *a\** is pivoted to the governor-spindle, but its lower end is hooked over a stud projecting from the inner end of the trip-lever B. If the rod *a\** is unhooked, the inner end of the trip-lever is raised by the action of the spring *d\** and the shoes are tripped off, as shown in Fig. 4. The lower end of the rod *a\** is chamfered off so that the same forms an inclined plane, and the button *e\** is in such a position that when the same is turned up and the balls are in their normal position the inclined plane of said rod does not come in contact with the button, as shown in Fig. 3, and the trip-lever is not permitted to follow the action of the spring $d^*$. If the balls drop down from any cause, the inclined plane of the rod $a^*$ strikes the rounded surface of the button $e^*$, and it is disengaged automatically from the stud in the trip-lever, so that said lever is allowed to follow the action of the spring and to trip off the shoes. The same device is shown in Figs. 5 and 6, showing its application to a double valve. In this case the hooks, shoes, or catches are tripped off by the action of inclined planes $B^*$ which occupy the place of the trip-lever in the previous figures. These inclined planes are secured to a rod, $f$, which is pivoted to a bell-crank lever, $g$, and from the lower end of this lever projects a stud, $h$, into a slot, $i$, in the lower end of the governor-spindle, or of a sleeve secured to said spindle or rod. A spring, $d^*$, is connected to the stud $h$, and has a tendency to raise that arm of the bell-crank lever to which the same is attached, and to throw the inclined planes into the position shown in Fig. 6 when the steam is cut off. The connection between the stud $h$ and slotted sleeve is effected by a hook, $j$, which is hinged to the sleeve, and from which an arm, $k$, extends, on which a cam or button, $e^*$, is made to slide. By the action of this button on a stationary pin or shaft, $l$, the hook, $j$ is liberated and the elbow-lever is allowed to follow the spring $d^*$ and to cut off the steam. In Fig. 5 the governor is shown in running position. The hook locks down the elbow-lever, and when the balls are in their mean position and the engine runs at its regular speed, the inclined planes are in the position shown in Fig. 5. If from any cause the balls drop down, the button $e^*$ strikes the rod or stud $l$, the hook is liberated, and the inclined planes are thrown forward by the action of the spring $d^*$ to the position shown in Fig. 6 and the engine stops. In all these cases the stop-motion is governed by the action of a spring and button on those parts which connect the governor with the cut-off valve.

I claim as new and desire to secure by Letters Patent—

The combination of a spring, $d$ or $d^*$, and button $e$ or $e^*$ with the rod $a$, or its equivalent, and with the trip-lever B or inclined planes $B^*$ or their equivalents, and with the governor A, substantially as and for the purposes herein shown and described.

JOHN JACKMAN, Jr.

Witnesses:
HENRY W. MOULTON,
HARRISON G. JOHNSON.